United States Patent
Yao et al.

(10) Patent No.: US 10,685,262 B2
(45) Date of Patent: Jun. 16, 2020

(54) OBJECT RECOGNITION BASED ON BOOSTING BINARY CONVOLUTIONAL NEURAL NETWORK FEATURES

(71) Applicant: Intel Corporation, Santa Clara, CA (US)

(72) Inventors: Anbang Yao, Beijing (CN); Lin Xu, Beijing (CN); Jianguo Li, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 15/551,870

(22) PCT Filed: Mar. 20, 2015

(86) PCT No.: PCT/CN2015/074757
§ 371 (c)(1),
(2) Date: Aug. 17, 2017

(87) PCT Pub. No.: WO2016/149881
PCT Pub. Date: Sep. 29, 2016

(65) Prior Publication Data
US 2018/0032844 A1     Feb. 1, 2018

(51) Int. Cl.
*G06K 9/00* (2006.01)
*G06K 9/62* (2006.01)
*G06K 9/46* (2006.01)
*G06K 9/80* (2006.01)
*G06N 3/04* (2006.01)
(Continued)

(52) U.S. Cl.
CPC ....... *G06K 9/6269* (2013.01); *G06K 9/00362* (2013.01); *G06K 9/4619* (2013.01); *G06K 9/6256* (2013.01); *G06K 9/6286* (2013.01); *G06K 9/66* (2013.01); *G06K 9/80* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2014/0214417 A1 | 7/2014 | Wang et al. | |
| 2016/0174902 A1* | 6/2016 | Georgescu | G06T 7/73 600/408 |

FOREIGN PATENT DOCUMENTS

| | | |
|---|---|---|
| CN | 102332089 | 1/2012 |
| CN | 103279759 | 9/2013 |

(Continued)

OTHER PUBLICATIONS

International Search Report and Written Opinion for International Patent Application No. PCT/CN2015/074757 dated Sep. 25, 2015.
(Continued)

*Primary Examiner* — Atiba O Fitzpatrick
(74) *Attorney, Agent, or Firm* — Green, Howard, & Mughal LLP

(57) ABSTRACT

Techniques related to implementing convolutional neural networks for object recognition are discussed. Such techniques may include generating a set of binary neural features via convolutional neural network layers based on input image data and applying a strong classifier to the set of binary neural features to generate an object label for the input image data.

25 Claims, 7 Drawing Sheets

(51) Int. Cl.
*G06N 3/08* (2006.01)
*G06K 9/66* (2006.01)

(56) References Cited

FOREIGN PATENT DOCUMENTS

CN 103971690 8/2014
CN 104268521 1/2015

OTHER PUBLICATIONS

Dalai, N. et al., "Histograms of oriented gradients for human detection", IEEE Computer Society Conference on Computer Vision and Pattern Recognition, Jun. 20-25, 2005, San Diego, CA, USA.

Felzenszwalb, Pedro F. et al., "Object Detection with Discriminatively Trained Part-Based Models", IEEE Transactions on Pattern Analysis and Machine Intelligence, vol. 32, No. 9, Sep. 2010.

Krizhevsky, A. et al., "ImageNet Classification with Deep Convolutional Neural Networks", In Advances in Neural Information Processing systems (NIPS), 2012, pp. 1-9.

Walk, S. et al., "New features and insights for pedestrian detection", IEEE Conference on Computer Vision and Pattern Recognition, Jun. 13-18, 2010, San Francisco, CA, USA.

Wang, X. et al., "An HOG-LBP human detector with partial occlusion handling", IEEE 12th International Conference on Computer Vision, Sep. 29-Oct. 2, 2009, Kyoto, Japan.

Zeiler, M. et al., "Visualizing and Understanding Convolutional Networks", European Conference on Computer Vision (ECCV 2014), pp. 818-833.

Zeng, X. et al., "Multi-Stage Contextual Deep Learning for Pedestrian Detection", Proceedings of the 2013 IEEE International Conference on Computer Vision, pp. 121-128, Dec. 1-8, 2013.

International Preliminary Report on Patentability for PCT Application No. PCT/CN15/74757 dated Oct. 5, 2017.

* cited by examiner

OBJECT RECOGNITION BASED ON BOOSTING BINARY CONVOLUTIONAL NEURAL NETWORK FEATURES

CLAIM OF PRIORITY

This Application is a National Stage Entry of, and claims priority to, PCT Application No. PCT/CN15/74757, filed on 20 Mar. 2015 and titled "OBJECT RECOGNITION BASED ON BOOSTING BINARY CONVOLUTIONAL NEURAL NETWORK FEATURES", which is incorporated by reference in its entirety for all purposes.

BACKGROUND

Object recognition may include the task of identifying objects in an image or a video sequence of images. Such object recognition techniques may have a wide range of applications. For example, human body recognition applications may include surveillance, robotics, automotive driving, and caring for the elderly. Furthermore, human body recognition may be important for computer vision applications such as pedestrian detection, human body tracking, human body identification, human pose estimation, human action recognition, image based people searching, and the like. Therefore, developing automated computer vision systems for performing object recognition in images or videos may be increasingly important.

For example, in human body recognition, current techniques may generally be divided into two categories: handcrafted feature based techniques and learned deep feature based techniques. Handcrafted feature based techniques may use manually designed features such as histograms of oriented gradients (HOG) features, a combination of HOG and local binary pattern (HOG-LBP) features, color self-similarity (CSS) features, or multi-scale HOG features and deformable part models (HOG-DPM) to describe human body appearances. Furthermore, learned deep feature based techniques may employ a deep convolutional neural network (CNN) in object recognition implementations. Results of such deep CNN implementations indicate hierarchical neural features learned from large-scale datasets may be more robust than handcrafted feature based techniques in handling complex object recognition tasks including human body recognition in challenging scenarios such as changes in pose, changes in lighting conditions, changes in viewpoint, objects with partial occlusion, and the like.

However, such deep CNN implementations may include hundreds of millions of parameters or more and complex feed-forward computations, which place a heavy burden on devices during implementation. For example, some deep CNN implementations may include 60 million floating point parameters, which cost about 232 MBs of memory space. Such intensive memory and computation requirements may make such deep CNN implementations unsuitable in many implementations, particularly in mobile device implementations.

It may be advantageous to perform object recognition with high accuracy, and with less computational and memory resource requirements. It is with respect to these and other considerations that the present improvements have been needed. Such improvements may become critical as the desire to perform object recognition becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
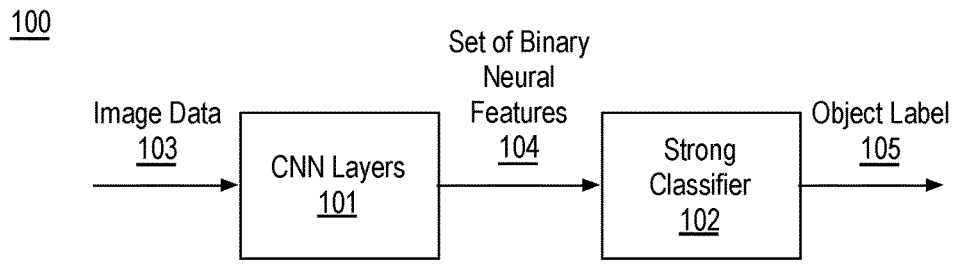
FIG. 1 illustrates an example device for performing object recognition.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein.

Methods, devices, apparatuses, computing platforms, and articles are described herein related to boosting binary convolutional neural network features for object recognition.

As described above, deep convolutional neural networks (CNN) may provide robust object recognition results. However, such deep CNN implementations may include hundreds of millions of parameters or more and intensive feed-forward computations, which place a heavy burden on devices during implementation. As is discussed herein, CNN layers may be provided to generate binary convolutional neural network features (e.g., binary neural features) that may be provided to a strong classifier for the generation of an object label for the input image data. The implementation of such CNN layers and a strong classifier may include only a fraction of the memory and computational requirements of a deep CNN while maintaining or improving object recognition results.

In some embodiments discussed herein, object recognition may include generating a set of binary neural features via one or more convolutional neural network layers based on input image data. The set of binary neural features may be associated with a predetermined subset of response maps such that the set of binary neural features are generated via implementation of the one or more convolutional neural network layers to provide results associated with such response maps. Furthermore, the subset of response maps may be a subset of available response maps available via implementation of the one or more convolutional neural network layers and/or via implementation of a full convolutional neural network including the one or more convolutional neural network layers. For example, the one or more convolutional neural network layers may be generated by eliminating convolutional neural network layers and/or response maps from a full deep convolutional neural network during a training phase.

During an implementation phase, a strong classifier may be applied to the set of binary neural features to generate an object label for the input image. Such an object label may be used by other device modules or applications for a variety of purposes such as object tracking, device security, building security, robotics, surveillance, automotive driving, or the like. For example, in human body recognition contexts, such human body recognition object labels may be used for pedestrian detection, human body tracking, human body identification, human pose estimation, human action or activity recognition, caring for the elderly, image based people searching, or the like. In some examples, the strong classifier may be trained or generated in an implementation phase based on the available response maps generated via the full convolutional neural network such that the strong classifier and the subset of response maps are generated during the training phase. For example, the subset of response maps (e.g., a combination of response maps that may generate the most discriminative binary neural features during implementation) may be chosen and the strong classifier may be generated via a boosting technique. As such, examples discussed herein may provide for object recognition such as human body recognition via boosting binary CNN features. Implementations of such convolutional neural networks including convolutional neural network layers and a strong classifier may provide improved object recognition accuracy with less memory requirements (e.g., about 14 MBs) and lower computation costs as compared to deep CNN implementations.

FIG. 1 illustrates an example device 100 for performing object recognition, arranged in accordance with at least some implementations of the present disclosure. As shown in FIG. 1, device 100 may include a convolutional neural network (CNN) layers module 101 and a strong classifier module 102. Device 100 may be any suitable form factor device such as a personal computer, a laptop computer, a tablet, a phablet, a smart phone, a digital camera, a gaming console, a wearable device, a display device, an all-in-one device, a two-in-one device, or the like. For example, device 100 may perform object recognition as discussed herein.

As shown, CNN layers module 101 may receive image data 103 (e.g., input image data). Image data 103 may include any suitable image or imaging data. In some examples, image data 103 may be received from an image sensor, an image signal processor, or the like. For example, image data 103 may include input pixel values for each pixel of an input image and the input pixel values may be provided for each channel of a color space such as R (red), G (green), and B (blue) values for input image data in the RGB (red green blue) color space. Although discussed with respect to the RGB color space, the input pixel values may be in any suitable color space such as the YUV (Y luminance, U chroma, and V chroma) color space, the YCbCr (luminance, blue difference, and red difference) color space, the CMYK (cyan, magenta, yellow, key or black) color space, or the like. Furthermore, image data 103 may include values for any number of pixels for any type of input image. For example, the input image may include a static image, an image frame of a video, portions thereof, or the like. In some examples, image data 103 may be spatially normalized image data such that the size of the image data may be constant and predetermined by CNN layers module 101. As discussed herein, in some examples, image data 103 may be spatially normalized at a size of 225×225 pixels. However, image data 103 may be any suitable size.

As shown, CNN layers module 101 may receive image data 103 and CNN layers module 101 may generate a set of binary neural features 104. CNN layers module 101 may receive image data 103 from an image sensor, an image processor, a memory, or any other source. CNN layers module 101 may generate binary neural features 104 using any suitable technique or techniques. For example, CNN layers module 101 may include a plurality of CNN layers that implement convolution kernels on image data 103 (e.g., at a first layer) or response maps data (e.g., at subsequent layers) or the like. Furthermore, such CNN layers may optionally implement rectified linear units, max pooling operations, a local response normalizations or the like to generate response maps data. CNN layers module 101 may generate binary neural features 104 as data representative of one or more response maps as is discussed further herein. For example, such binary neural features 104 may include data associated with one or more response maps from any layer of the CNN layers implemented via CNN layers module 101.

In some examples, binary neural features 104 may be generated via a final layer of CNN layers implemented via CNN layers module 101. For example, one or more CNN layers implemented via CNN layers module 101 may be fully evaluated (e.g., a full set of convolution kernels may be applied) and a final CNN layer implemented via CNN layers module 101 may be partially evaluated such that only selected convolutional kernels (e.g., associated with a subset of response maps of available response maps) may be applied to generate binary neural features 104. However, as discussed, in other examples, such binary neural features 104 may include binary neural features generated at other layers (e.g., fully evaluated layers) implemented via CNN layers module 101. CNN layers module 101 may provide binary neural features 104 to strong classifier module 102 and/or a memory of device 100 (not shown).

Strong classifier module 102 may receive binary neural features 104 from CNN layers module 101 or memory and strong classifier module 102 may generate an object label 105 based on binary neural features 104. Object label 105 may be any suitable object detection label. For example, in body recognition contexts, object label 105 may include a body recognition object label such as a label of human, a label of background (e.g., not a recognized body), a label of mid-body or torso, a label of head, a label of bottom-body or legs, or the like. As discussed herein, device 100 may provide object recognition including human body recognition. However, device 100 may provide any suitable object recognition such as animal or pet recognition, automobile recognition, hand recognition, gesture recognition, or the like.

Strong classifier module 102 may determine object label 105 using any suitable technique or techniques. For example, strong classifier module 102 may apply a strong classifier to binary neural features 104 to generate object label 105. In some examples, the strong classifier implemented via strong classifier module 102 may be generated in a training phase based on a pool of available response maps and image training data as is discussed further herein. For example, a boosting technique may be implemented based on a pool of binary neural features associated with the pool of available response maps such that the pool of binary features are generated for images in the image training data. For example, the pool of binary features and the known classification of the known image training data may define support vector machines to determine the set of predetermined response maps and the strong classifier.

Figure 2:
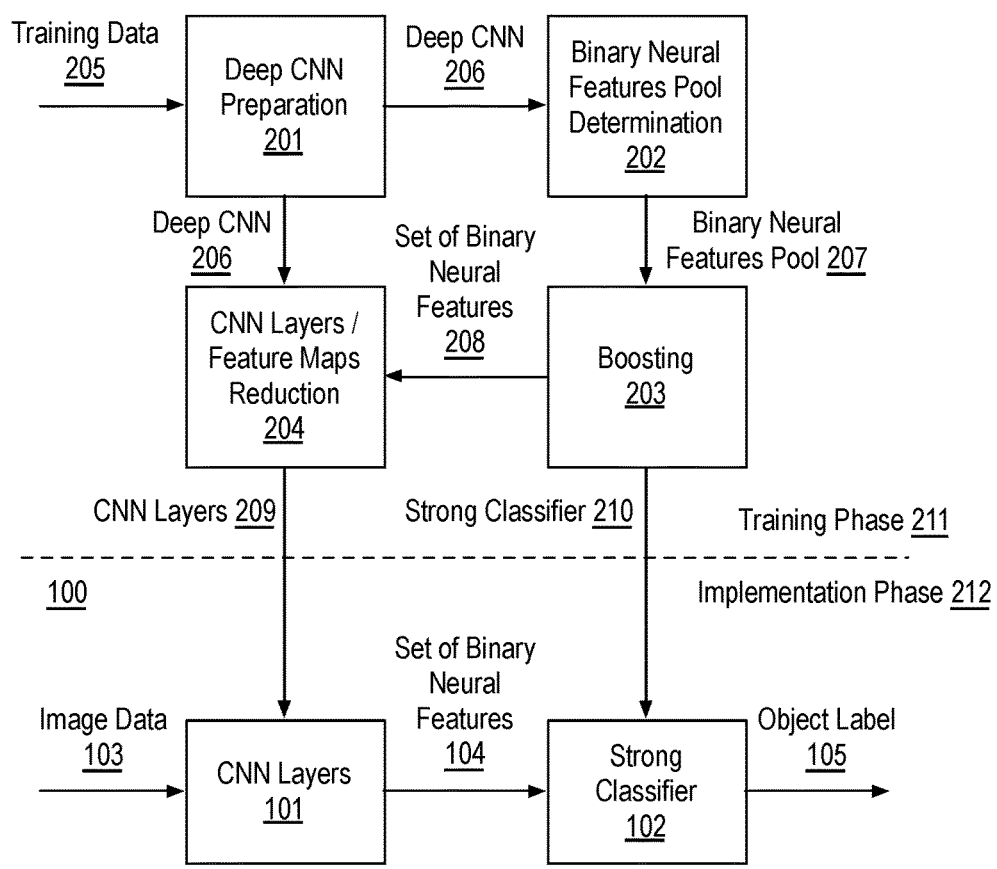
FIG. 2 illustrates an example system for performing object recognition training and for performing object recognition.

FIG. 2 illustrates an example system for performing object recognition training and for performing object recognition, arranged in accordance with at least some implementations of the present disclosure. As shown in FIG. 2, CNN layers module 101 and strong classifier module 102 may be provided in an implementation phase 212 after generation, development, training, or preparation or the like in a training phase 211. For example, system 200 may provide an object recognition system such as a human body recognition system, or the like. As shown, system 200 may include a deep CNN preparation module 201, a binary neural features pool determination module 202, a boosting module 203, and a CNN layers/feature maps reduction module 204. As shown, system 200 may include a deep CNN 206 built via pre-training and fine-tuning (e.g., as provided via deep CNN preparation module 201), a binary neural features pool 207 used as candidate weak classifiers, and a strong classifier 210 learned based on determining the most discriminative binary neural feature combination (e.g., set of binary neural features 208) via boosting module 203 (e.g., by applying a boosting technique). For example, only a portion of deep CNN 206 may be retained for implementation via CNN layers 101 of device 100. The portion of deep CNN 206 retained for implementation via CNN layers 101 may include those layers and those feature maps needed to generate set of binary neural features 104 during implementation phase 212, for example.

As shown, training data 205 may be received for pre-training and fine-tuning deep CNN 206 via a deep CNN preparation module 201. Deep CNN preparation module 201 may generate and/or train deep CNN 206 using any suitable technique or techniques. In some examples, deep CNN preparation module 201 may pre-train and fine-tune a CNN model to generate deep CNN 206. For example, pre-training may train an initial model on an outside large scale dataset (e.g., of training data 205). Furthermore, fine-tuning may adapt the initial model to fit a target dataset (e.g., of training data 205). In an example human body recognition implementation, pre-training may be performed based on a 1,000 category visual classification dataset including about 1.2 million images such as the ImageNet dataset and fine-tuning may be performed on a person dataset such as the French Institute for Research in Computer Science and Automation (INRIA) person dataset. However, any suitable training data 205 associated with any suitable object recognition may be implemented via system 200.

Figure 3:
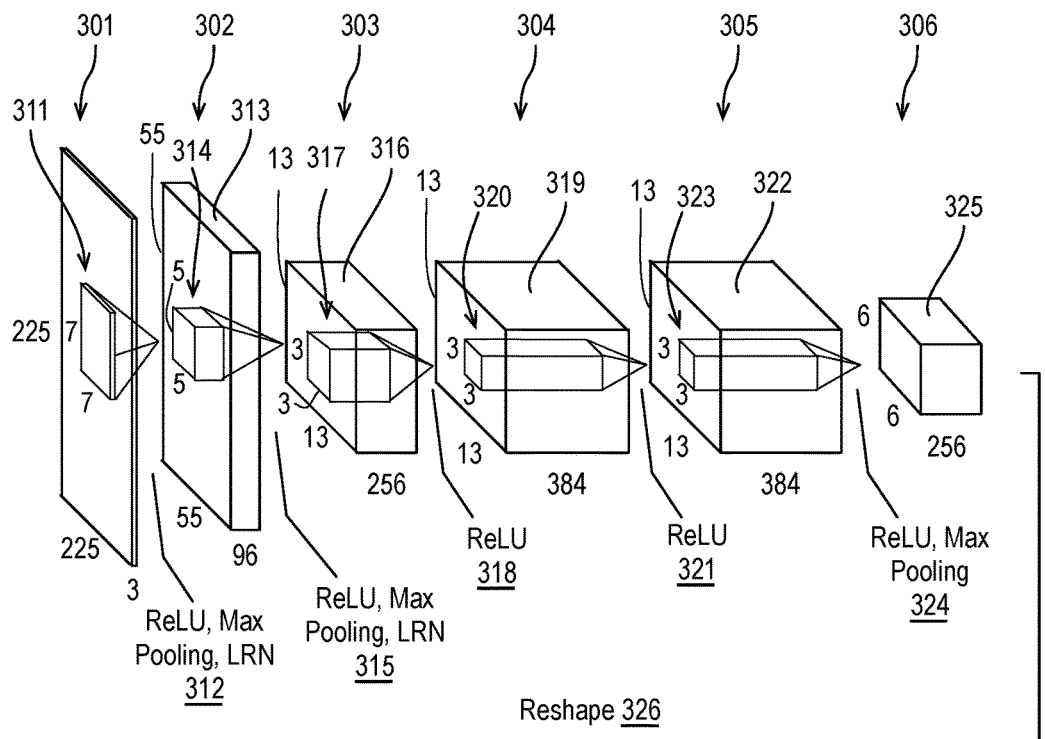
FIG. 3 illustrates an example deep convolutional neural network.
Figure 3:
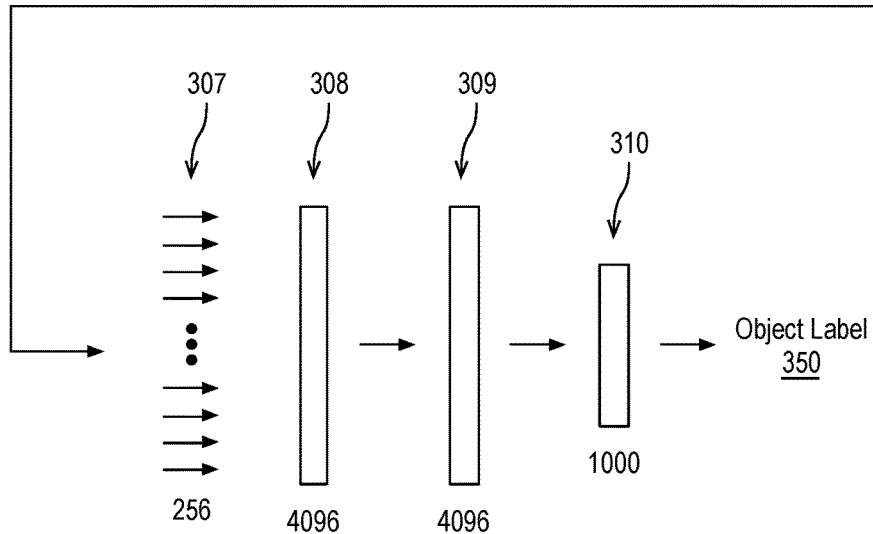

FIG. 3 illustrates an example deep convolutional neural network 206, arranged in accordance with at least some implementations of the present disclosure. As shown in FIG. 3, in some examples, deep CNN 206 may include an 8-layer deep CNN model having layers 302, 303, 304, 305, 306, 308, 309, and 310. In the illustrated example, deep CNN 206 includes 5 convolutional layers 302-306 and 3 fully connected layers 308-310. Also as shown, convolutional layers 302-306 may be followed by various combinations of rectified linear units (ReLU), max pooling, and/or local response normalization (LRN). For example, as shown, ReLU, max pooling, and LRN 312 may be positioned between layers 301 and 302, ReLU, max pooling, and LRN 315 may be positioned between layers 302 and 303, ReLU 318 may be positioned between layers 303 and 304, ReLU 321 may be positioned between layers 304 and 305, and ReLU and max pooling 324 and may be positioned between layer 305 and 306.

For example, as shown, deep CNN 206 may receive input image data or input layer 301 including spatially normalized image data such that, as labeled, input layer 301 may be 225×225 pixels and may include 3 color planes (e.g., red, green, and blue color planes). However, any size and color space input layer may be implemented via deep CNN 206.

Also as shown, convolutional layer 302 may receive input layer 301 (e.g., having an input size of 225×225×3) and convolution kernels applied via convolutional layer 302 and ReLU, max pooling, and LRN 312 may provide feature maps 313 having an output size of 55×55×96. For example, at convolutional layer 302, multiple convolution kernels such as convolution kernel 311 may be applied to input layer 301. Such convolution kernels may be convolved with input layer 301 for example. In some instances, such convolution kernels may be characterized as filters, convolution filters, color filters, or the like. For example, the multiple convolution kernels applied at convolutional layer 302 may include 96 7×7 convolution kernels (e.g., with each convolution kernel associated with one of the 96 55×55 feature maps 313) having a stride of 2. For example, subsequent to applying convolution kernels such as convolutional kernels 311, ReLU, max pooling, and LRN 312 may be applied to generate feature maps 313. In some examples, ReLU, max pooling, and LRN 312 may include a ReLU, a 3×3 max pooling with a stride of 2, and an LRN with a size of 5. Furthermore, as used herein, a feature map may include data generated via such processing and/or a feature map may be used to indicate a vector or features or the like that may be made via such processing. For example, during implementation, a feature map may be implemented such that the feature map may be implemented or data-filled or the like to generate feature vectors, features, binary neural features, hierarchical neural features, or the like.

As shown in FIG. 3, convolutional layer 303 may receive feature maps 313 (e.g., convolutional layer 303 may receive inputs having an input size of 55×55×96) and convolution kernels applied via convolutional layer 303 and ReLU, max pooling, and LRN 315 may provide feature maps 316 having an output size of 13×13×256. For example, at convolutional layer 303, multiple convolution kernels such as convolution kernel 314 may be applied to feature maps 313. Subsequently, ReLU, max pooling, and LRN 315 may be applied to generate feature maps 316. For example, the convolution kernels may include 256 5×5 convolution kernels (e.g., with each convolution kernel associated with one of the 256 13×13 feature maps 316), the max pooling may include 3×3 max pooling with a stride of 2, and the LRN may have a size of 5.

Convolutional layer 304 may receive feature maps 316 (e.g., convolutional layer 304 may receive inputs having an input size of 13×13×256) and convolution kernels applied via convolutional layer 304 and ReLU 318 may provide feature maps 319 having an output size of 13×13×384. For example, at convolutional layer 304, multiple convolution kernels such as convolution kernel 317 may be applied to feature maps 316. Subsequently, ReLU 318 may be applied to generate feature maps 319. For example, the convolution kernels may include 384 3×3 convolution kernels (e.g., with each convolution kernel associated with one of the 384 13×13 feature maps 319).

Convolutional layer 305 may receive feature maps 319 (e.g., convolutional layer 305 may receive inputs having an input size of 13×13×384) and convolution kernels applied via convolutional layer 305 and ReLU 321 may provide feature maps 322 having an output size of 13×13×384. For example, at convolutional layer 305, multiple convolution kernels such as convolution kernel 320 may be applied to feature maps 319. Subsequently, ReLU 321 may be applied to generate feature maps 322. For example, the convolution kernels may include 384 3×3 convolution kernels (e.g., with each convolution kernel associated with one of the 384 13×13 feature maps 322).

Convolutional layer 306 may receive feature maps 322 (e.g., convolutional layer 306 may receive inputs having an input size of 13×13×384) and convolution kernels applied via convolutional layer 306 and ReLU and max pooling 324 may provide feature maps 325 having an output size of 6×6×256. For example, at convolutional layer 306, multiple convolution kernels such as convolution kernel 323 may be applied to feature maps 322. Subsequently, ReLU and max pooling 324 may be applied to generate feature maps 325. For example, the convolution kernels may include 256 3×3 convolution kernels (e.g., with each convolution kernel associated with one of the 256 6×6 feature maps 325) and the max pooling may include 3×3 max pooling with a stride of 2.

As discussed, deep CNN 206 may have 5 convolutional layers 302-306 with the described implementation details. However, in other examples, deep CNN may include any number of convolutional layers (e.g., 3 to 8 convolutional layers or the like) with any implementation details. For example, different numbers of convolutional layers, sizes or shapes of convolution kernels, strides, numbers of convolution kernels, different combinations of ReLU units, max pooling operations, and LRN operations at different convolutional layers, or the like may be used to generate deep CNN 206.

As shown, response maps 325 may be reshaped via optional reshape operation 326 and provided as response maps 307 (e.g., response maps 307 may also be characterized as feature maps, feature vectors, binary neural features, hierarchical neural features, or the like) to fully connected layers 308-310 to generate object label 350. For example, fully connected layer 308 may receive 6×6×256=9,216 dimension input vectors (please refer to response maps 325) and fully connected layer 308 may have 4,096 outputs and 6×6×256×4096 neural parameters (e.g., excluding 1-D bias terms). Fully connected layer 309 may provide 4,096 outputs and 4096×4096 neural parameters (e.g., excluding 1-D bias terms). Fully connected layer 310 may include 1,000 outputs (e.g., 1,000 object labels with respective probability values that sum to 1) and 4096×1000 neural parameters (e.g., excluding 1-D bias terms). For example, fully connected layers 308, 309 may provide fully connected and weighted network nodes and fully connected layer 310 may provide a fully connected softmax functions or the like. Although 3 fully connected layers 308-310 are discussed having the described implementation details, any number of fully connected layers with any implementation details may be provided or implemented via deep CNN 206. In some examples, object label 350 may include an object label having the highest probability value of the 1,000 object label outputs from fully connected layer 310.

As discussed, although deep CNN 206 may provide high accuracy object recognition results (e.g., human body recognition results or the like), the implementation of deep CNN 206 may be prohibitively expensive in terms of memory space and computation complexity, particularly in mobile devices. For example, deep CNN 206 may include over 60 million floating point parameters costing about 237 MBs of memory, which may place heavy burdens on devices during implementation. For example, a large portion of such parameters may be within fully connected layers 308-310 (e.g., about 88% to 90% of such parameters in some implementations). Furthermore, response maps 307, in some instances, may be highly abstracted but also highly correlated due to cross-channel computations performed at convolutional layers 302-306. For example, in some instances, most discriminative response maps from among response maps 307 and/or response maps 313, 316, 319, 322, 325 may be used (e.g., others may be discarded) to high quality perform object recognition via a strong classifier (e.g., replacing fully connected layers 308-310) as discussed herein with respect to strong classifier module 102, strong classifier 210, and strong classifier 508.

Returning to FIG. 2, as shown, deep CNN 206 may be provided to binary neural features pool determination module 202 and CNN layers/feature maps reduction module 204. For example, binary neural features pool determination module 202 may determine a binary neural features pool 207, boosting module 203 may determine set of binary neural features 208 based on binary neural features pool 207 and implementation of a boosting technique, and CNN layers/feature maps reduction module 204 may eliminate any unneeded layers of deep CNN 206 and/or any unneeded response maps of deep CNN 204 to generate CNN layers 209 for implementation via CNN layers module 101. For example, unneeded layers and/or unneeded response maps of deep CNN 204 may be those layers and/or response maps that are not needed to generate set of binary features 104 (e.g., fully connected layers using all available response maps of deep CNN 206 may be replaced by a strong classifier that uses only a subset of the available response maps of deep CNN 206).

As discussed, deep CNN 206 may be provided to binary neural features pool determination module 202, which may determine binary neural features pool 207. Binary neural features pool determination module 202 may determine binary neural features pool 207 using any suitable technique or techniques. For example, each channel (e.g., each response map of response maps 313, 316, 319, 322, 325) generated at each of convolutional layers 302-306 may represent a kind of pattern of the input image (e.g., as provided via input layer 301). Any of such channels or response maps (e.g., response maps 313, 316, 319, 322, 325) may provide a candidate binary neural feature for binary neural features pool 207. In an example, all of such channels or response maps (e.g., response maps 313, 316, 319, 322, 325) may provide binary neural features pool 207. In other examples, a subset of such channels or response maps (e.g., response maps 313, 316, 319, 322, 325) may provide binary neural features pool 207. In some examples, response maps from the final convolutional layer of deep CNN 206 (e.g., response maps 325 of convolutional layer 306) may have the most expressive power of the available response maps (e.g., channels). In an example, response maps from only the final convolutional layer of deep CNN 206 (e.g., response maps 325 of convolutional layer 306) may provide binary neural features pool 207. In the example of FIG. 3, such binary neural features pool 207 may include 256 channels (e.g., response maps) with each channel or response map including 6×6 elements (please refer to FIG. 2) such that binary neural features pool 207 includes response maps 325 (e.g. binary neural features associated with response maps 325, please refer to FIG. 3). However, binary neural features pool 207 may include any combination of response maps from any layer or layers of deep CNN 206.

As shown, binary neural features pool determination module 202 may provide binary neural features pool 207 to boosting module 203. Boosting module 203 may receive binary neural features pool 207 and boosting module 203 may generate set of binary neural features 208 and strong classifier 210. For example, binary neural features 208 may include the most descriptive binary neural features available via deep CNN 206. Furthermore, strong classifier 210 may be implemented via strong classifier module 102, which may evaluate, during implementation phase 212, binary neural features 104 to generate object label 105. For example, binary neural features 104 may be analogous to binary neural features 208 such that binary neural features 104 are generated via the same response maps used to generate binary neural features 208. For example, such response maps may be implemented via CNN layers 101 during implementation phase 212.

Boosting module 203 may generate set of binary neural features 208 and strong classifier 210 using any suitable technique or techniques. For example, boosting module 203 may automatically choose binary neural features 208 for use in object recognition. For example, boosting module 203 may apply a boosting technique to provide binary neural features pool 207 to generate binary neural features 208 (e.g., and also indicating associated response maps) and strong classifier 210. In some examples, boosting module 203 may generate set of binary neural features 208 and strong classifier 210 as illustrated in FIG. 4.

Figure 4:
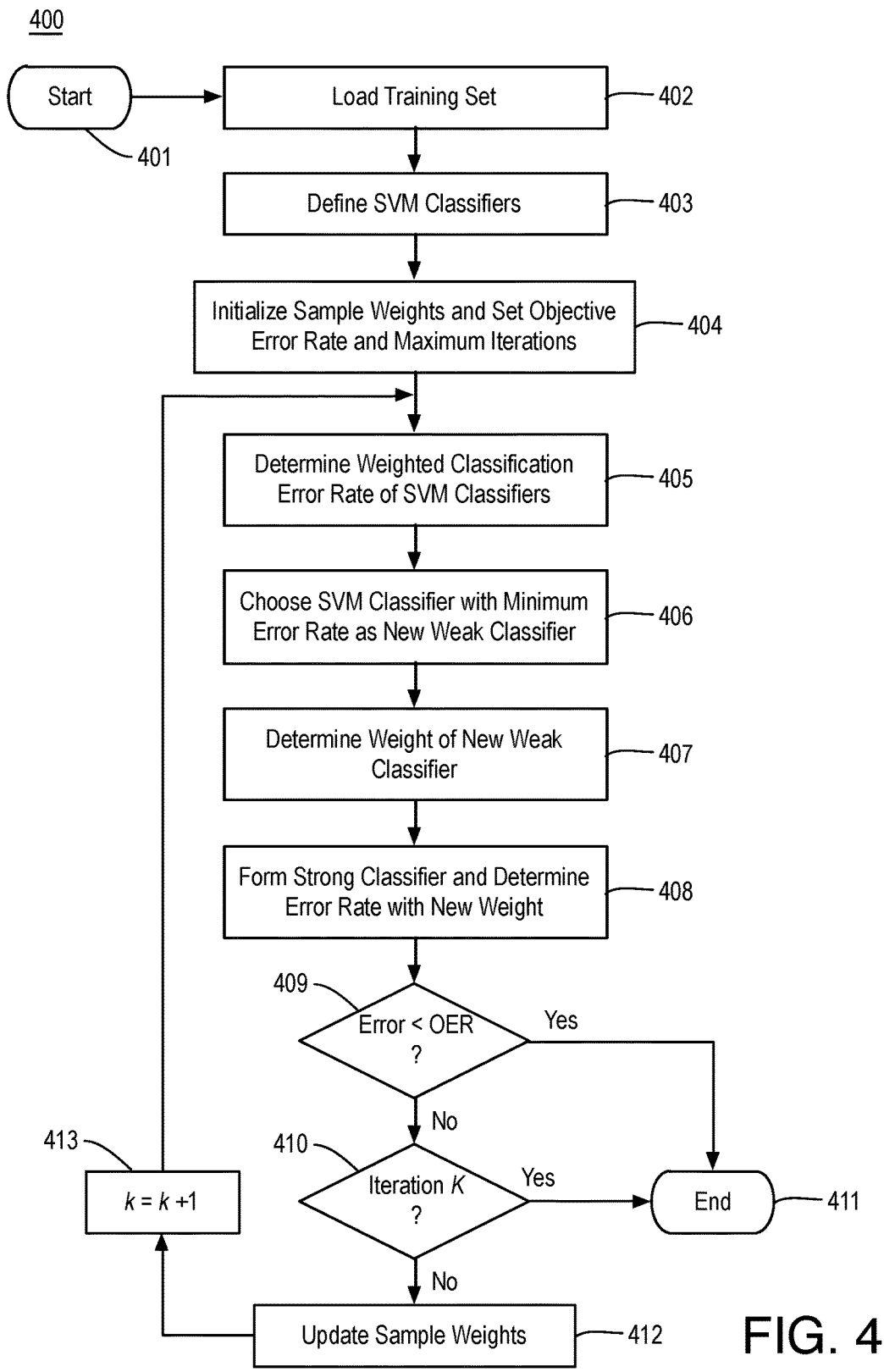
FIG. 4 is a flow diagram illustrating an example process for training a strong classifier.

FIG. 4 is a flow diagram illustrating an example process 400 for training a strong classifier, arranged in accordance with at least some implementations of the present disclosure. Process 400 may include one or more operations 401-413 as illustrated in FIG. 4. Process 400 may be performed by a device (e.g., device 100, any other devices or systems discussed herein, or an external training device such as a computer device or the like) to train a strong classifier and to select a subset of response maps for implementation as discussed herein. Process 400 or portions thereof may be repeated for any training sets, strong classifiers, or the like. As discussed, due to the cross-computation process used to generate response maps, there may be a strong correlation and considerable redundancy among binary neural features pool 207. Process 400 may apply boosting to provide support vector machine (SVM) classifiers as candidate weak classifiers and to find the most discriminative binary neural features combination among them (e.g., binary neural features 208) through boosting and to learn a strong classifier (e.g., strong classifier 210).

As shown, process 400 may begin from start operation 401 at operation 402, "Load Training Set", where a training set of data may be loaded. Such training data may include any suitable training data such as known or generated binary neural features representative of a binary neural features pool such as binary neural features pool 207 for a plurality of training image data and known object label results for such training image data. In some examples, such a training set may be generated via CNN layers such as CNN layers 302-306 or the like. For example, the training set may include training data as shown with respect to Equation (1)-(4):

Training Set:

$$T=\{(x_1,y_1), \ldots (x_i,y_i), \ldots (x_N,y_N)\} \quad (1)$$

$$x_i \in R^{36} \quad (2)$$

$$y_i \in \{+1,-1\} \quad (3)$$

$$i=1,2,\ldots N \quad (4)$$

where T may be the training set, x may be 36 dimensional real vectors, y may be either +1 or −1 indicating the class or category to which x belongs, i may be a counter variable, and N may be the number of training images. As discussed, in the illustrative example x may be 36 dimensional representing the dimensions, 6×6 of response maps 325 (please refer to FIG. 3) however x may be any suitable size representing the dimensions of associated response maps.

Process 400 may continue at operation 403, "Define SVM Classifiers", where support vector machine (SVM) classifiers may be defined. Such SVM classifiers may be defined using any suitable technique or techniques. Such SVM classifiers may have been trained via the pre-training and fine-tuning of deep CNN 206, for example. For example, the SVM classifiers may be defined as shown with respect to Equations (5) and (6):

SVM Classifiers:

$$G_m(x)=X\rightarrow\{+1,-1\} \quad (5)$$

$$m=1,2,\ldots 256 \quad (6)$$

where G may be an SVM classifier, m may be a counter variable for the 256 response maps or channels in the binary neural features pool and, therefore, the 256 SVM classifiers, and X may categorize into +1 or −1 based on x. As discussed, in the illustrative example there may be 256 SVM classifiers associated with the 256 response maps 325 (please refer to FIG. 3), however there may be any suitable number of response maps and associated SVM classifiers in other examples.

Process 400 may continue at operation 404, "Initialize Sample Weights and Set Objective Error Rate and Maximum Iterations", where sample weights may be initialized and an objective error rate, and a maximum number of iterations may be set. Such sample weights may be initialized using any suitable technique or techniques. For example, such sample weights may be initialized as equal values and such that the sample weights sum to one. The objective error rate may include any suitable error rate below which processing will end. For example the objective error rate may be chosen such that an achieved error rate in processing may be determined to meet a particular error quality metric or the like. For example, the objective error rate may be a threshold error rate or the like. In some examples, the objective error rate may be small such that an error rate approaching zero may be expected. Furthermore, the maximum number of iterations may be set using any suitable technique or techniques. In some examples, the maximum number of iterations may be about 10,000 iterations or more. For example, sample weights may be initialized and the maximum number of iterations may be set as show in Equations (7) and (8):

Initialize Sample Weights:

$$D=(w_{1,1},\ldots w_{1,i},\ldots w_{1,N}) \quad (7)$$

Maximum Iterations $$K=\text{max iterations} \quad (8)$$

where D may be sample weights and K may be the number of maximum iterations.

Process 400 may continue at operation 405, "Determine Weighted Classification Error Rate of SVM Classifiers", where weighted classification error rates may be determined for the SVM classifiers. The weighted classification error rates may be determined using any suitable technique or techniques. For example, the weighted classification error rates may be determined as shown with respect to Equation (9):

$$err_m = \sum_{i=1}^{N} w_{ki} I(G_m(x_i) \neq y_i) \quad (9)$$

where err may be the weighted classification error, k may be a counter for the current iteration (e.g., the current iteration may be iteration k of a maximum K iterations), and I may be an indicator function returning a value of 1 if the SVM classifier mis-classified x and a value of 0 otherwise.

Process 400 may continue at operation 406, "Choose SVM Classifier with Minimum Error Rate as New Weak Classifier", where an SVM classifier with a minimum error rate may be selected as a new weak classifier. The SVM classifier with the minimum error rate may be determined using any suitable technique or techniques such as comparing error rates among the SVM classifier and identifying the SVM classifier with the minimum error rate. For example, the SVM classifier with the minimum error rate may be determined as shown with respect to Equation (10):

$$M_k=\arg\min_m(err_m) \quad (10)$$

where M may be the new weak classifier and arg min may be an argument of the minimum function that returns the argument associated with a minimum error. For example, if a new weak classifier is determined at an iteration k, the weak classifier may be added to a strong classifier being determined via process 400.

Process 400 may continue at operation 407, "Determine Weight of New Weak Classifier", where a weight may be determined for the new weak classifier determined at operation 406. The weight of the new weak classifier may be determined using any suitable technique or techniques. For example, the weight of the new weak classifier may be determined as shown with respect to Equation (11):

$$\alpha_k = \frac{1}{2}\log\left(\frac{1-err_{M_k}}{err_{M_k}}\right) \quad (11)$$

where α may be the weight of the new weak classifier.

Process 400 may continue at operation 408, "Form Strong Classifier and Determine Error Rate with New Weight", where a strong classifier may be formed or updated and an error rate of the strong classifier with the new weight may be determined. For example, the strong classifier may be formed or updated based on the weak classifiers generated in iterations up until the current iteration (e.g., those weak classifiers that are currently available). Furthermore, the error rate of the strong classifier with the new weight for the new weak classifier may be determined using any suitable technique or techniques. For example, the strong classifier may be generated or updated as shown with respect to Equation (12) and the error rate of the strong classifier with the new weight for the new weak classifier may be determined as shown with respect to Equation (13):

$$G_k = \text{sign}\left(\sum_{f=1}^{k} \alpha_f G_{M_f}(x)\right) \quad (12)$$

$$ERR = \frac{1}{N}\sum_{i=1}^{N} I(G(x_i) \neq y_i) \quad (13)$$

where G may be the strong classifier, sign may be a sign function that provides an object label and/or performs classification, f may be a counter variable, ERR may be the error rate of the strong classifier, and I may be an indicator function as discussed.

Process 400 may continue at decision operation 409, "Error<OER?", where a determination may be made as to whether the error rate of the strong classifier is less than the objective error rate (OER) set at operation 404. If so, process 400 may end at end operation 411. For example, if an error rate of less than a predetermined threshold is reached in the current iteration for the strong classifier, further processing may be stopped. In some examples, an error rate of zero may be reached. If not, process 400 may continue at decision operation 410, "Iteration K?", where a determination may be made as to whether the current iteration, k, is the maximum iteration, K (e.g., the maximum number of iterations has been reached). If so, process 400 may end at end operation 411. If not, process 400 may continue at operation 412 for continued processing.

For example, process 400 may continue at operation 412, "Update Sample Weights", where sample weights, as initialized at operation 404, may be updated. The sample weights may be updated using any suitable technique or techniques. The sample weights may provide, for example, for discarding classifiers with low accuracy (e.g., and low weights) and keeping those with high accuracy (e.g., and high weights) for potential inclusion in the final strong classifier. For example, the sample weights may be updated as shown with respect to Equations (14) and (15):

$$w_{k+1,i} = \frac{w_{ki}}{Z_k} \exp(-\alpha_k y_i G_{M_k}(x_i)) \tag{14}$$

$$Z_k = \sum_{i=1}^{N} w_{ki} \exp(-\alpha_k y_i G_{M_k}(x_i)) \tag{15}$$

where $w_{k+1,i}$ may be the updated sample weights.

Process 400 may continue at operation 413, "k=k+1", where the iteration counter variable may be increased, and at operation 405, where processing may be repeated as discussed herein. For example, operations 405-408 may be repeated to generate a strong classifier with an error rate of zero or a minimum error rate based on the maximum number of iterations, K.

As discussed, process 400 may be used to generate a strong classifier and to define a set of binary neural features (e.g., binary neural features 208). Process 400 may be repeated any number of times for training sets, any number of object recognition types (e.g., human object recognition, animal or pet object recognition, and so on), or the like.

Returning to FIG. 2, binary neural features 208 may be provided to CNN layers/feature maps reduction module 204 and strong classifier 210 may be provided to strong classifier module 102 for implementation via device 100. CNN layers/feature maps reduction module 204 may receive binary neural features 208 and CNN layers/feature maps reduction module 204 may reduce deep CNN 206 by eliminating portions thereof based on binary neural features 208.

For example, CNN layers/feature maps reduction module 204 may reduce deep CNN 206 to generate CNN layers 209 for implementation via CNN layers module 101 of device 100. CNN layers/feature maps reduction module 204 may reduce deep CNN 206 to generate CNN layers 209 using any suitable technique or techniques. For example, CNN layers/feature maps reduction module 204 may eliminate fully connected layers from deep CNN 206 as such fully connected layers may be replaced during implementation phase 212 by strong classifier module 102. Furthermore, CNN layers/feature maps reduction module 204 may reduce deep CNN 206 by eliminating any unneeded convolutional layers from deep CNN 206. For example, if a last convolutional layer or multiple last convolutional layers of deep CNN 206 are not needed to generate binary neural features 104, such unneeded convolutional layers may be eliminated in forming CNN layers 209. However, convolutional layers of deep CNN 206 prior to the last convolutional layer may need to remain and be fully implemented if even a single response map is needed from the last convolutional layer.

Also, CNN layers/feature maps reduction module 204 may reduce deep CNN 206 by eliminating response maps from the final convolutional layer of deep CNN 206. For example, as discussed, binary neural features 208 may include a subset of binary neural features pool 207. Furthermore, in the illustrative example, all of binary neural features 208 are determined based on a last convolutional layer. In such examples, response maps other than those associated with binary neural features 208 (e.g., unneeded response maps) may be discarded.

As shown, CNN layers/feature maps reduction module 204 may generate CNN layers 209 for implementation via CNN layers module 101 as discussed herein. Such an implementation via device 100 of CNN layers module 101 and strong classifier module 102 may provide high quality object label results with greatly reduced memory usage and computational resources consumption. An example implementation of convolutional neural network layers and a strong classifier are illustrated with respect to FIG. 5.

Figure 5:
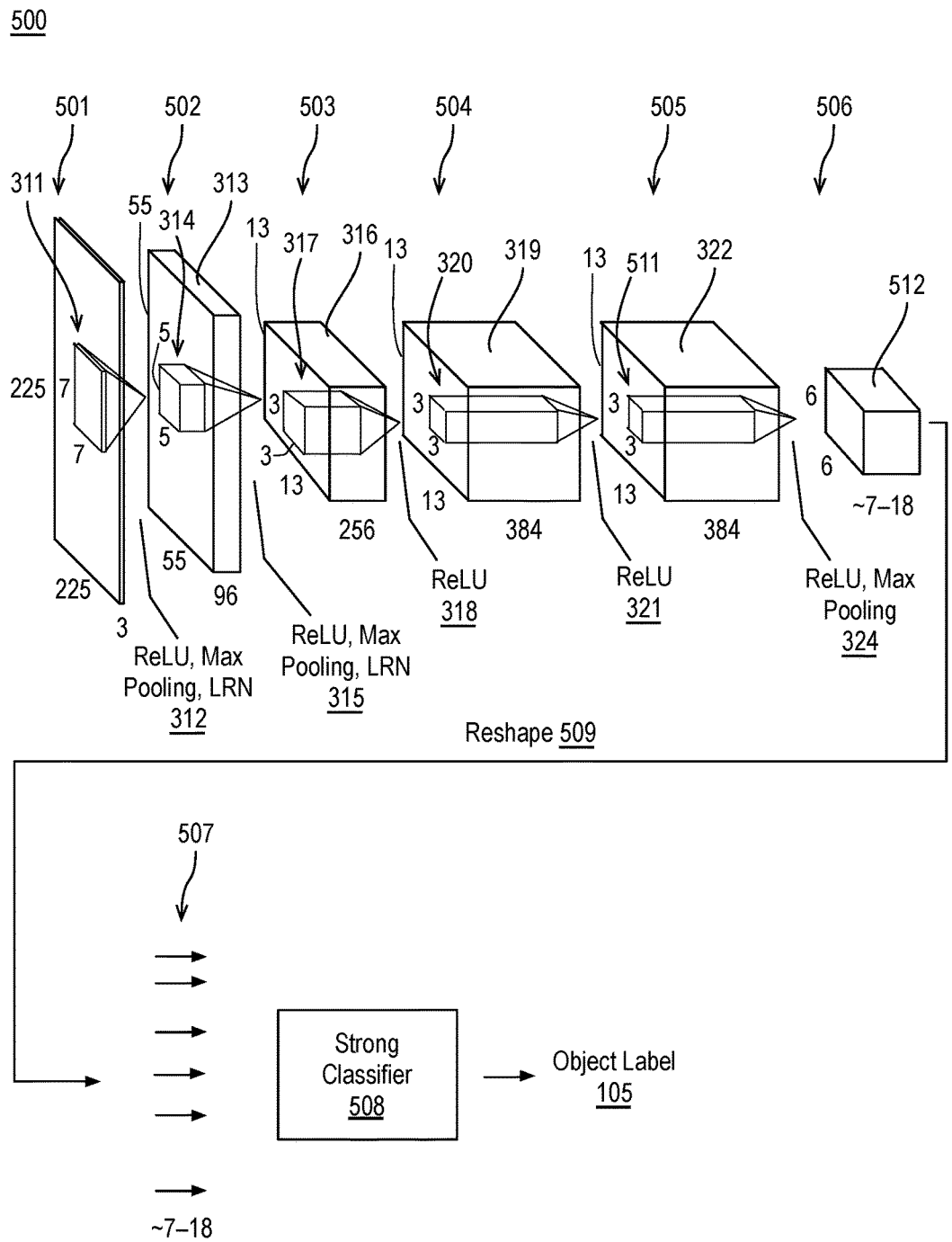
FIG. 5 illustrates an example system for providing object recognition including convolutional neural network layers and a strong classifier.

FIG. 5 illustrates an example system 500 for providing object recognition including convolutional neural network layers 502-506 and a strong classifier 508, arranged in accordance with at least some implementations of the present disclosure. For example, convolutional neural network layers 502-506 may be implemented via CNN layers module 101 and strong classifier 508 may be implemented via strong classifier module 102. As shown in FIG. 5, in some examples, system 500 may include 5 convolutional layers 502-506. Also as shown, convolutional layers 502-506 may be followed by various combinations of rectified linear units (ReLU), max pooling, and/or local response normalization (LRN). For example, as shown, system 500 may receive input image data or input layer 501 including spatially normalized image data such that, as labeled, input layer 301 may be 225×225 pixels and may include 3 color planes (e.g., red, green, and blue color planes or the like). However, as discussed, any size and color space input layer may be implemented via system 500. For example, input layer 501 may be generated based on image data 103 or input layer 501 may be image data 103 or the like.

As shown, convolutional layers 502-505 may implement convolution kernels 311, 314, 317, and 320 and/or ReLU, max pooling, and LRN 312, ReLU, max pooling, and LRN 315, ReLU 318, ReLu 321, and ReLU and max pooling 324 as discussed with respect to FIG. 3. Such details will not be repeated for the sake of clarity of presentation. Also, as discussed with respect to FIG. 3, different implementation details (e.g., different numbers of convolutional layers, sizes or shapes of convolution kernels, strides, numbers of convolution kernels, different combinations of ReLU units, max pooling operations, and LRN operations at different convolutional layers, or the like) may be provided via system 500.

Also as shown, at final or last convolutional layer 506, multiple 3×3 convolution kernels such as convolution kernel 511 and ReLU and max pooling 324 may be applied to response maps 322 at convolutional layer 505 to generate response maps 512 including a reduced number of response maps (e.g., about 7 to 18 response maps) response maps having 6×6 features. For example, as discussed, response maps 512 may be associated with binary neural features 208 such that only a subset of response maps 512 of available response maps (e.g., response maps 325 and/or other response maps associated with deep CNN 206) need to be evaluated to provide object label 105. For example, binary neural features may be generated associated with response maps 512 based on image data associated with input layer 501.

Such binary neural features (.e.g., response maps 512) may be optionally reshaped via reshape operation 509 and provided as binary neural features 507 to strong classifier 508. As shown in FIG. 5 and in contrast to FIG. 3, only a limited number of binary neural features (e.g., a set of about 7 to 18 binary neural features) are provided to strong classifier 508. Any number of binary neural features such as about 5 to 20 neural features or 7 to 18 neural features or the like may be provided via binary neural features 507. For example, the number of neural features may be determined during the training of strong classifier 508 as discussed herein. Strong classifier 508 may implement a strong classifier trained as discussed with respect to FIG. 4, for example, to generate object label 105 based on binary neural features 507.

Although shown in FIG. 5 with all of response maps 512 and/or binary neural features 507 being generated via convolutional layer 506, response maps 512 and/or binary neural features 507 may be generated via any of convolutional layers 502-506 such that at least one response map/binary neural feature is generated via convolutional layer 506 (e.g., if no response maps/binary neural features were generated via convolutional layer 506, convolutional layer 506 would be eliminated as unneeded in system 500). For example, one or more of response maps 512 and/or binary neural features 507 may come from convolutional layer 502, convolutional layer 503, convolutional layer 504, convolutional layer 505, or any combination thereof.

As discussed, implementations of CNN layers module 101 and strong classifier module 102 may provide high accuracy object label results with greatly reduced memory usage and computational resources consumption. For example, in human recognition contexts, results for an INRIA person dataset test case were evaluated for a deep CNN and a system including CNN convolution layers and a strong classifier as discussed herein. For example, INRIA person dataset pedestrian images were segmented to segment each pedestrian image into 3 overlapped square parts of the same size. For example, for pedestrian images with 512 pixels in height and 256 pixels in width, the images were segment to generate a top of the image to represent "head and shoulders", a middle to represent "body", and a bottom to represent "legs and feet". Each segment was labeled as "Pos1", "Pos2" and "Pos3", respectively. The same procedure was implemented on background images and all segmented background images were labeled as "Bg". Since INRIA person dataset includes 2474 pedestrian images and 5000 background images, 2474 images labeled as "Pos1", "Pos2" and "Pos3", respectively, and 15000 images labeled as "Bg" were generated. Furthermore, the pedestrian and background images were enlarged to 512×512 pixels and resized it to 256×256 pixels. The resized pedestrian was labeled as "Pos0". Based on such techniques, 7 different human body recognition tasks were generated: "Pos0 vs Bg", "Pos1 vs Bg", "Pos2 vs Bg", "Pos3 vs Bg", "Pos1 vs Pos2", "Pos1 vs Pos3" and "Pos3 vs Pos2", respectively. The samples of each task were divided into training and testing sets randomly and a fine-tuned 8-layer deep CNN model was generated. For each of the 256 response maps which are the inputs of the first fully connected layer (e.g., response maps 325), 7 SVM classifiers were trained for each task. For each SVM classifier, four-fifths of the samples were randomly selected for training and the rest (e.g., one-fifth) for testing. The same evaluation protocol was applied to the deep CNN technique and CNN layers/strong classifier technique. Table 1 summarizes the results of such evaluations.

TABLE 1

Performance Comparison between Deep CNN Technique and CNN Layers/Strong Classifier Technique

| Task | Deep CNN Technique | | CNN Layers/Strong Classifier Technique | |
|---|---|---|---|---|
| | Best Index Channel | Error Rate (%) | Number of Selected Binary Neural Features | Error Rate (%) |
| Pos0 vs. Bg | Whole Model | 1 | 7 | 0 |
| Pos1 vs. Bg | 7 | 4.59 | 7 | 0 |
| Pos2 vs. Bg | 20 | 6.28 | 7 | 0 |
| Pos3 vs. Bg | 206 | 6.26 | 9 | 0.0286 |
| Pos1 vs. Pos2 | 224 | 9.21 | 10 | 0.2024 |
| Pos1 vs. Pos3 | 206 | 6.28 | 10 | 0 |
| Pos2 vs. Pos3 | 206 | 7.29 | 18 | 0.409 |

As shown via Table 1, the CNN Layers/Strong Classifier Technique may provide for better recognition accuracy in the 7 discussed human body recognition tasks as compared to a 8-layer Deep CNN Technique. Furthermore, the model size of the CNN Layers/Strong Classifier Technique is about 14 MBs, which is only about 12.24% of the size of 8-layer Deep CNN Technique.

Figure 6:
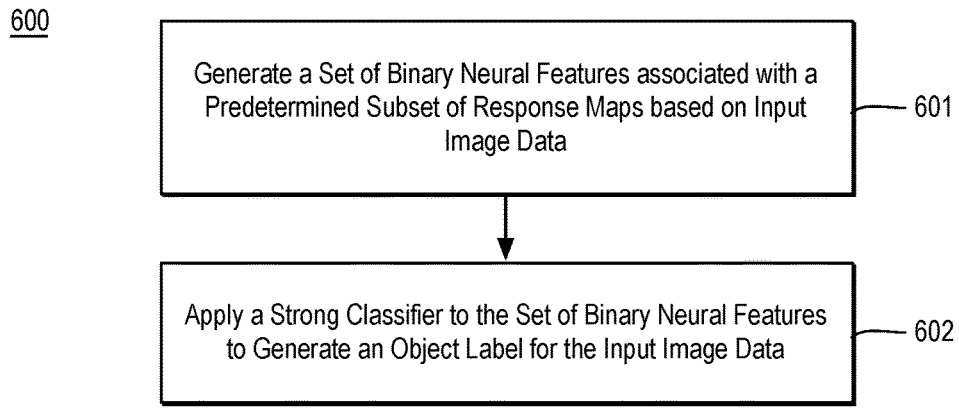
FIG. 6 is a flow diagram illustrating an example process for providing object recognition.

FIG. 6 is a flow diagram illustrating an example process 600 for performing object recognition, arranged in accordance with at least some implementations of the present disclosure. Process 600 may include one or more operations 601 and 602 as illustrated in FIG. 6. Process 600 may form at least part of an object recognition process. By way of non-limiting example, process 600 may form at least part of an object recognition process performed by device 100 as discussed herein during an implementation phase. Furthermore, process 600 will be described herein with reference to system 700 of FIG. 7.

Figure 7:
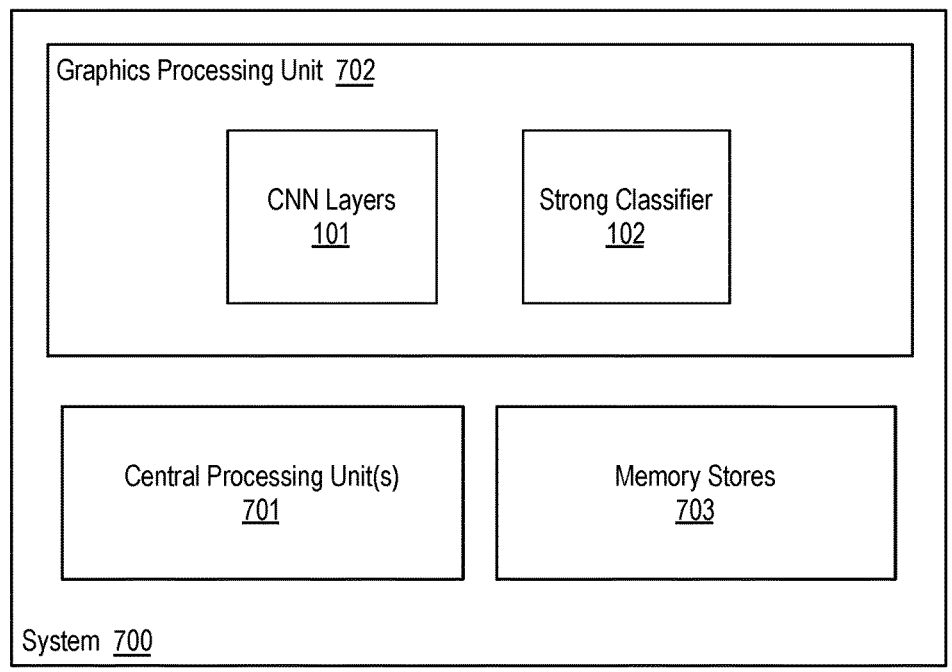
FIG. 7 is an illustrative diagram of an example system for providing object recognition.

FIG. 7 is an illustrative diagram of an example system 700 for performing object recognition, arranged in accordance with at least some implementations of the present disclosure. As shown in FIG. 7, system 700 may include one or more central processing units (CPU) 701, a graphics processing unit 702, and memory stores 703. Also as shown, graphics processing unit 702 may include CNN layers module 101 and strong classifier module 102. Such modules may be implemented to perform operations as discussed herein. In the example of system 700, memory stores 703 may store input image data, CNN layer data, binary neural features, object labels, image layer data, response maps data, convolution kernel data, ReLU data, max pooling data, LRN data, strong classifier data, sample weights, or the like.

As shown, in some examples, CNN layers module 101 and strong classifier module 102 may be implemented via graphics processing unit 702. In other examples, one or both or portions of CNN layers module 101 and strong classifier module 102 may be implemented via central processing units 701 or an image processing unit (not shown) of system 700. In yet other examples, one or both or portions of CNN layers module 101 and strong classifier module 102 may be implemented via an imaging processing pipeline, graphics pipeline, or the like.

Graphics processing unit 702 may include any number and type of graphics processing units, that may provide the operations as discussed herein. Such operations may be implemented via software or hardware or a combination thereof. For example, graphics processing unit 702 may include circuitry dedicated to manipulate image data, CNN data, strong classifier, or the like obtained from memory stores 703. Central processing units 701 may include any number and type of processing units or modules that may provide control and other high level functions for system 700 and/or provide any operations as discussed herein. Memory stores 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 703 may be implemented by cache memory. In an embodiment, one or both or portions of CNN layers module 101 and strong classifier module 102 may be implemented via an execution unit (EU) of graphics processing unit 702. The EU may include, for example, programmable logic or circuitry such as a logic core or cores that may provide a wide array of programmable logic functions. In an embodiment, one or both or portions of CNN layers module 101 and strong classifier module 102 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or both or portions of CNN layers module 101 and strong classifier module 102 may be implemented via an application specific integrated circuit (ASIC). The ASIC may include an integrated circuitry customized to perform the operations discussed herein.

Returning to discussion of FIG. 6, process 600 may begin at operation 601, "Generate a Set of Binary Neural Features associated with a Predetermined Subset of Response Maps based on Input Image Data", where, via one or more convolutional neural network layers, a set of binary neural features may be generated based on input image data. As discussed, the input image data may include spatially normalized image data and the binary neural features may include hierarchical neural features, feature vectors, response map data, or the like. For example, the set of binary neural network features may be associated with a predetermined subset of response maps associated with the one or more convolutional neural network layers. For example, CNN layers module 101 as implemented via graphics processing unit 702 may generate the set of binary neural features based on input image data. For example, CNN layers module 101 as implemented via graphics processing unit 702 may implement the one or more convolutional neural network layers.

In some examples, the predetermined subset of response maps (e.g., those associated with binary neural features 104) may be from multiple available response maps (e.g., those associated with binary neural features pool 207 and/or additional response maps such as all available response maps) associated with a full convolutional neural network (e.g., deep CNN) including the convolutional neural network layers. For example, the full convolutional neural network may include, in addition to the discussed convolutional neural network layers, an additional convolutional neural network layer and/or fully connected neural network layers eliminated prior to implementation as discussed herein.

In some examples, the convolutional neural network layers may include one or more fully evaluated convolutional neural network layers (e.g., convolutional layers 502-505) and a partially evaluated convolutional neural network layer (e.g., convolutional layer 506). In some examples, the set of binary neural features may be generated via the partially evaluated convolutional neural network layer (e.g., convolutional layer 506). In other examples, the set of binary neural features may be generated via the partially evaluated convolutional neural network layer (e.g., convolutional layer 506) and one or more of the fully evaluated convolutional neural network layers (e.g., convolutional layers 502-505). For example, the set of binary neural features may be generated by applying, via one or more convolutional neural network layers of convolutional neural network layers, a convolution kernel and one or more of a rectified linear unit, a max pooling operation, or a local response normalization.

Processing may continue at operation 602, "Apply a Strong Classifier to the Set of Binary Neural Features to Generate an Object Label for the Input Image Data", where a strong classifier may be applied to the set of binary neural features to generate an object label for the input image data. The object label may be any suitable type of object label such as a human body object recognition label. For example, strong classifier module 102 as implemented via graphics processing unit 702 may apply a strong classifier trained during a training phase to generate the object label for the input image data.

As discussed, CNN layers and a strong classifier may be applied to input image data to generate an object label. In some examples, the CNN layers and the strong classifier may have been generated or trained or the like during a training phase. For example, a full convolutional neural network (e.g., a deep CNN) including at least the one or more convolutional neural network layers and one or more fully connected neural network layers may be generated, an available pool of response maps may be generated based on the full convolutional neural network, and the predetermined subset of response maps may be determined from the available pool of response maps (e.g., the most discriminative response maps may be chosen for implementation). Furthermore, in some examples, the one or more fully connected neural network layers and a plurality of first response maps may be eliminated from the full convolutional neural network based on the predetermined subset of response maps to generate the one or more convolutional neural network layers. In some examples, determining the predetermined subset of response maps may include applying a boosting technique to generate a strong classifier based on the predetermined subset of response maps.

Process 600 may provide for generating an object label based on input image data. Process 600 may be repeated any number of times either in series or in parallel for any number of input images, input frames, or the like. As discussed process 600 may provide for high quality object recognition results and in implementation (e.g., as implemented with respect to system 700) may provide for reduced memory and computational requirements.

Various components of the systems described herein may be implemented in software, firmware, and/or hardware and/or any combination thereof. For example, various components of device 100, system 700, system 800, or device 900 may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 100, system 700, system 800, or device 900, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
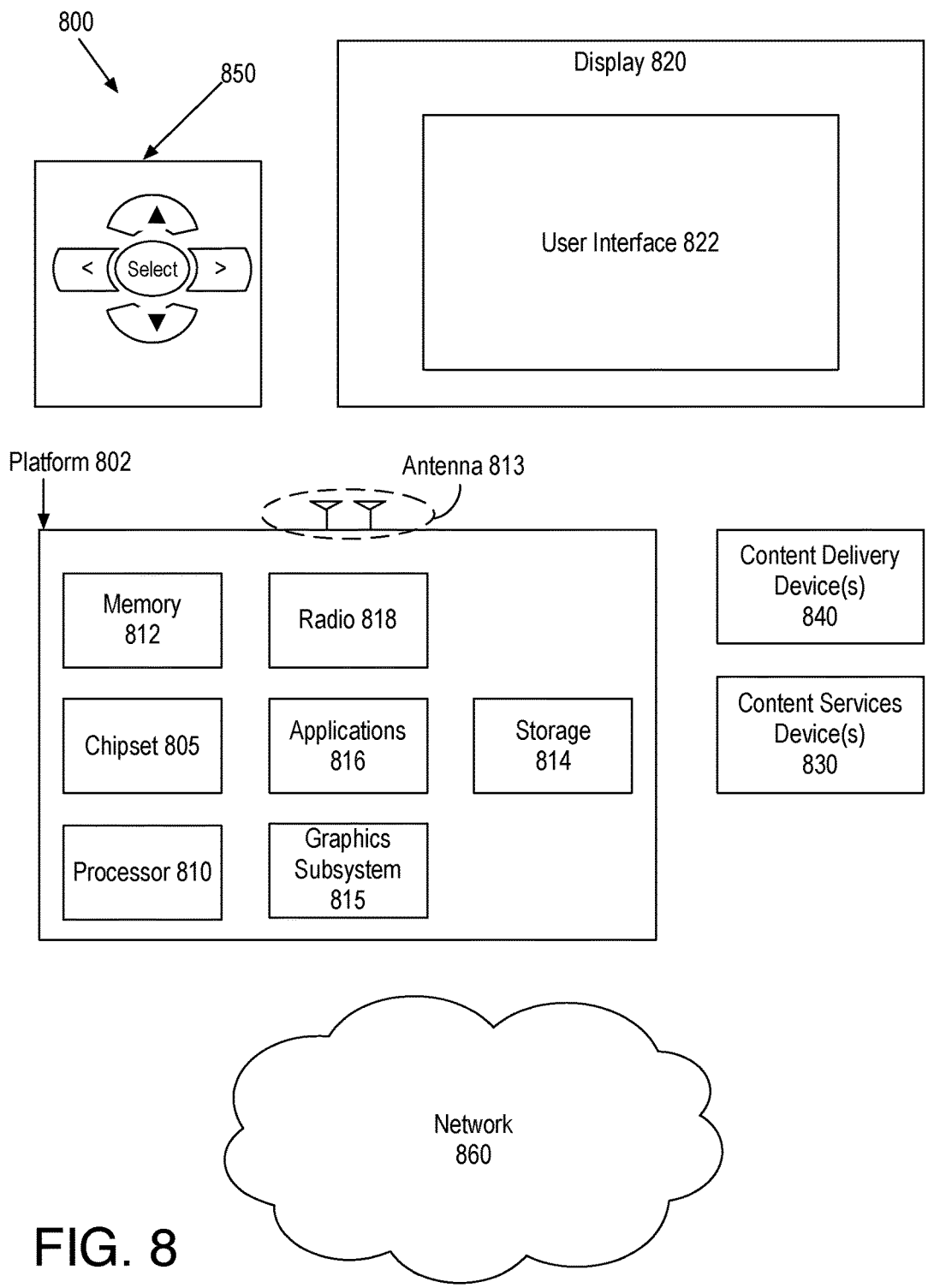
FIG. 8 is an illustrative diagram of an example system.

FIG. 8 is an illustrative diagram of an example system 800, arranged in accordance with at least some implementations of the present disclosure. In various implementations, system 800 may be a computing system although system 800 is not limited to this context. For example, system 800 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 800 includes a platform 802 coupled to a display 820. Platform 802 may receive content from a content device such as content services device(s) 830 or content delivery device(s) 840 or other similar content sources such as a camera or camera module or the like. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still images, graphics, or video for display. Graphics subsystem 815 may be a graphics processing unit (GPU), a visual processing unit (VPU), or an image processing unit, for example. In some examples, graphics subsystem 815 may perform scanned image rendering as discussed herein. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any flat panel monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of navigation controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, navigation controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
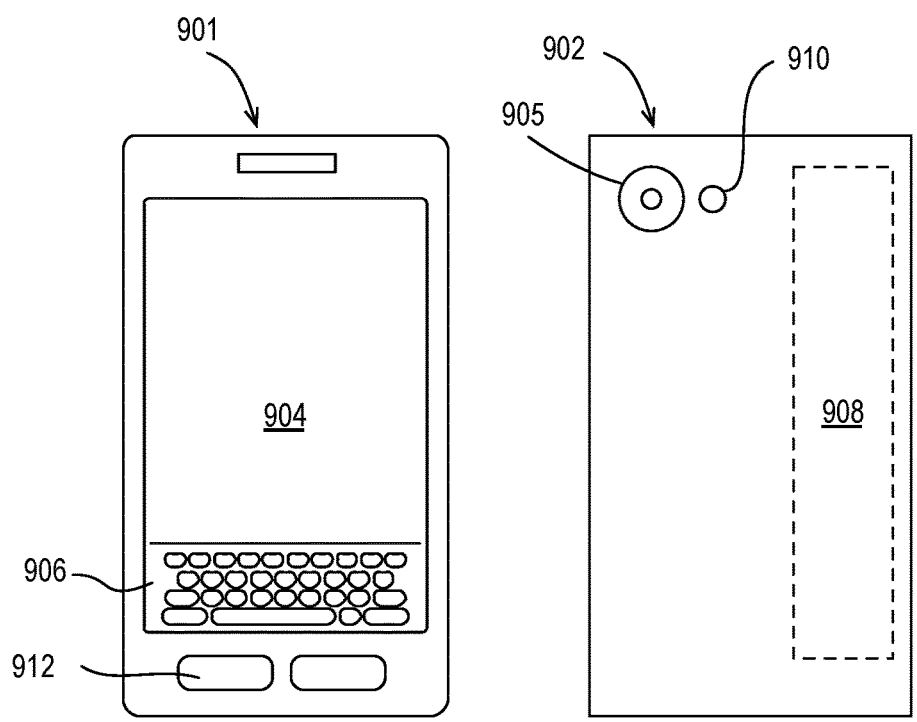
FIG. 9 illustrates an example device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 800 may be implemented via device 900. In other examples, device 100, system 700, system 800, or device 900, or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include a camera 905 (e.g., including a lens, an aperture, and an imaging sensor) and a flash 910 integrated into back 902 (or elsewhere) of device 900. In other examples, camera 905 and flash 910 may be integrated into front 901 of device 900 or both front and back cameras may be provided. Camera 905 and flash 910 may be components of a camera module to originate image data processed into streaming video that is output to display 904 and/or communicated remotely from device 900 via antenna 908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for performing object recognition comprises generating, via one or more convolutional neural network layers, a set of binary neural features based on input image data, wherein the set of binary neural network features are associated with a predetermined subset of response maps associated with the one or more convolutional neural network layers and applying a strong classifier to the set of binary neural features to generate an object label for the input image data.

Further to the first embodiments, the predetermined subset of response maps are from a plurality of available response maps associated with a full convolutional neural network comprising the convolutional neural network layers.

Further to the first embodiments, the predetermined subset of response maps are from a plurality of available response maps associated with a full convolutional neural network comprising the convolutional neural network layers, wherein the full convolutional neural network further comprises an additional convolutional neural network layer and one or more fully connected neural network layers.

Further to the first embodiments, the one or more convolutional neural network layers comprise a plurality of fully evaluated convolutional neural network layers and a partially evaluated convolutional neural network layer.

Further to the first embodiments, the one or more convolutional neural network layers comprise a plurality of fully evaluated convolutional neural network layers and a partially evaluated convolutional neural network layer, wherein the set of binary neural features are generated via the partially evaluated convolutional neural network layer.

Further to the first embodiments, the input image data comprises spatially normalized image data and wherein the set of binary neural features comprises a plurality of feature vectors.

Further to the first embodiments, generating the set of binary neural features comprises applying, via a first convolutional neural network layer of the one or more convolutional neural network layers, a convolution kernel and at least one of a rectified linear unit, a max pooling operation, or a local response normalization.

Further to the first embodiments, the object label comprises a human body recognition object label.

Further to the first embodiments, the method further comprises generating, based on training image data, a full convolutional neural network comprising at least the one or more convolutional neural network layers and one or more fully connected neural network layers, generating an available pool of response maps based on the full convolutional neural network, and determining the predetermined subset of response maps from the available pool of response maps.

Further to the first embodiments, the method further comprises generating, based on training image data, a full convolutional neural network comprising at least the one or more convolutional neural network layers and one or more fully connected neural network layers, generating an available pool of response maps based on the full convolutional neural network, determining the predetermined subset of response maps from the available pool of response maps, and eliminating the one or more fully connected neural network layers and a plurality of first response maps from the full convolutional neural network based on the predetermined subset of response maps to generate the one or more convolutional neural network layers.

Further to the first embodiments, the method further comprises generating, based on training image data, a full convolutional neural network comprising at least the one or more convolutional neural network layers and one or more fully connected neural network layers, generating an available pool of response maps based on the full convolutional neural network, and determining the predetermined subset of response maps from the available pool of response maps, wherein determining the predetermined subset of response maps comprises applying a boosting technique to generate the strong classifier based on the predetermined subset of response maps.

In one or more second embodiments, a system for providing a performing object recognition comprises a memory configured to receive input image data and a graphics processing unit coupled to the memory, the graphics processing unit to generate, via one or more convolutional neural network layers, a set of binary neural features based on input image data, wherein the set of binary neural network features are associated with a predetermined subset of response maps associated with the one or more convolutional neural network layers and to apply a strong classifier to the set of binary neural features to generate an object label for the input image data.

Further to the second embodiments, the predetermined subset of response maps are from a plurality of available response maps associated with a full convolutional neural network comprising the convolutional neural network layers.

Further to the second embodiments, the predetermined subset of response maps are from a plurality of available response maps associated with a full convolutional neural network comprising the convolutional neural network layers, wherein the full convolutional neural network further comprises an additional convolutional neural network layer and one or more fully connected neural network layers.

Further to the second embodiments, the one or more convolutional neural network layers comprise a plurality of fully evaluated convolutional neural network layers and a partially evaluated convolutional neural network layer.

Further to the second embodiments, the one or more convolutional neural network layers comprise a plurality of fully evaluated convolutional neural network layers and a partially evaluated convolutional neural network layer, wherein the graphics processing unit to generate the set of binary neural features comprises the graphics processing unit to generate the set of binary neural features via the partially evaluated convolutional neural network layer.

Further to the second embodiments, the input image data comprises spatially normalized image data and wherein the set of binary neural features comprises a plurality of feature vectors.

Further to the second embodiments, the graphics processing unit to generate the set of binary neural features comprises the graphics processing unit to apply, via a first convolutional neural network layer of the one or more convolutional neural network layers, a convolution kernel and at least one of a rectified linear unit, a max pooling operation, or a local response normalization.

Further to the second embodiments, the object label comprises a human body recognition object label.

Further to the second embodiments, the graphics processing unit further to generate, based on training image data, a full convolutional neural network comprising at least the one or more convolutional neural network layers and one or more fully connected neural network layers, to generate an available pool of response maps based on the full convolutional neural network, and to determine the predetermined subset of response maps from the available pool of response maps.

Further to the second embodiments, the graphics processing unit further to generate, based on training image data, a full convolutional neural network comprising at least the one or more convolutional neural network layers and one or more fully connected neural network layers, to generate an available pool of response maps based on the full convolutional neural network, to determine the predetermined subset of response maps from the available pool of response maps, and to eliminate the one or more fully connected neural network layers and a plurality of first response maps from the full convolutional neural network based on the predetermined subset of response maps to generate the one or more convolutional neural network layers.

Further to the second embodiments, the graphics processing unit further to generate, based on training image data, a full convolutional neural network comprising at least the one or more convolutional neural network layers and one or more fully connected neural network layers, to generate an available pool of response maps based on the full convolutional neural network, and to determine the predetermined subset of response maps from the available pool of response maps, wherein the graphics processing unit to determine the predetermined subset of response maps comprises the graphics processing unit to apply a boosting technique to generate the strong classifier based on the predetermined subset of response maps.

In one or more third embodiments, a system for providing a performing object recognition comprises means for generating, via one or more convolutional neural network layers, a set of binary neural features based on input image data, wherein the set of binary neural network features are associated with a predetermined subset of response maps associated with the one or more convolutional neural network layers, means for applying a strong classifier to the set of binary neural features to generate an object label for the input image data, and means for providing the object label associated with the input image.

Further to the third embodiments, the predetermined subset of response maps are from a plurality of available response maps associated with a full convolutional neural network comprising the convolutional neural network layers.

Further to the third embodiments, the predetermined subset of response maps are from a plurality of available response maps associated with a full convolutional neural network comprising the convolutional neural network layers, wherein the full convolutional neural network further comprises an additional convolutional neural network layer and one or more fully connected neural network layers.

Further to the third embodiments, the one or more convolutional neural network layers comprise a plurality of fully evaluated convolutional neural network layers and a partially evaluated convolutional neural network layer.

Further to the third embodiments, the one or more convolutional neural network layers comprise a plurality of fully evaluated convolutional neural network layers and a partially evaluated convolutional neural network layer, wherein the set of binary neural features are generated via the partially evaluated convolutional neural network layer.

Further to the third embodiments, the input image data comprises spatially normalized image data and wherein the set of binary neural features comprises a plurality of feature vectors.

Further to the third embodiments, the means for generating the set of binary neural features comprise means for applying, via a first convolutional neural network layer of the one or more convolutional neural network layers, a convolution kernel and at least one of a rectified linear unit, a max pooling operation, or a local response normalization.

Further to the third embodiments, the object label comprises a human body recognition object label.

Further to the third embodiments, the system further comprises means for generating, based on training image data, a full convolutional neural network comprising at least the one or more convolutional neural network layers and one or more fully connected neural network layers, means for generating an available pool of response maps based on the full convolutional neural network, and means for determining the predetermined subset of response maps from the available pool of response maps.

Further to the third embodiments, the system further comprises means for generating, based on training image data, a full convolutional neural network comprising at least the one or more convolutional neural network layers and one or more fully connected neural network layers, means for generating an available pool of response maps based on the full convolutional neural network, means for determining the predetermined subset of response maps from the available pool of response maps, and means for eliminating the one or more fully connected neural network layers and a plurality of first response maps from the full convolutional neural network based on the predetermined subset of response maps to generate the one or more convolutional neural network layers.

Further to the third embodiments, the system further comprises means for generating, based on training image data, a full convolutional neural network comprising at least the one or more convolutional neural network layers and one or more fully connected neural network layers, means for generating an available pool of response maps based on the full convolutional neural network, and means for determining the predetermined subset of response maps from the available pool of response maps, wherein the means for determining the predetermined subset of response maps comprises means for applying a boosting technique to generate the strong classifier based on the predetermined subset of response maps.

In one or more fourth embodiments, at least one machine readable medium comprises a plurality of instructions that, in response to being executed on a computing device, cause the computing device to perform object recognition by generating, via one or more convolutional neural network layers, a set of binary neural features based on input image data, wherein the set of binary neural network features are associated with a predetermined subset of response maps associated with the one or more convolutional neural network layers, applying a strong classifier to the set of binary neural features to generate an object label for the input image data, and providing the object label associated with the input image.

Further to the fourth embodiments, the predetermined subset of response maps are from a plurality of available response maps associated with a full convolutional neural network comprising the convolutional neural network layers.

Further to the fourth embodiments, the predetermined subset of response maps are from a plurality of available response maps associated with a full convolutional neural network comprising the convolutional neural network layers, wherein the full convolutional neural network further comprises an additional convolutional neural network layer and one or more fully connected neural network layers.

Further to the fourth embodiments, the one or more convolutional neural network layers comprise a plurality of fully evaluated convolutional neural network layers and a partially evaluated convolutional neural network layer.

Further to the fourth embodiments, the one or more convolutional neural network layers comprise a plurality of fully evaluated convolutional neural network layers and a partially evaluated convolutional neural network layer, wherein the set of binary neural features are generated via the partially evaluated convolutional neural network layer.

Further to the fourth embodiments, the input image data comprises spatially normalized image data and wherein the set of binary neural features comprises a plurality of feature vectors.

Further to the fourth embodiments, generating the set of binary neural features comprises applying, via a first convolutional neural network layer of the one or more convolutional neural network layers, a convolution kernel and at least one of a rectified linear unit, a max pooling operation, or a local response normalization.

Further to the fourth embodiments, the object label comprises a human body recognition object label.

Further to the fourth embodiments, the machine readable medium further comprises instructions that, in response to being executed on the computing device, cause the computing device to perform object recognition by generating, based on training image data, a full convolutional neural network comprising at least the one or more convolutional neural network layers and one or more fully connected neural network layers, generating an available pool of response maps based on the full convolutional neural network, and determining the predetermined subset of response maps from the available pool of response maps.

Further to the fourth embodiments, the machine readable medium further comprises instructions that, in response to being executed on the computing device, cause the computing device to perform object recognition by generating, based on training image data, a full convolutional neural network comprising at least the one or more convolutional neural network layers and one or more fully connected neural network layers, generating an available pool of response maps based on the full convolutional neural network, determining the predetermined subset of response maps from the available pool of response maps, and eliminating the one or more fully connected neural network layers and a plurality of first response maps from the full convolutional neural network based on the predetermined subset of response maps to generate the one or more convolutional neural network layers.

Further to the fourth embodiments, the machine readable medium further comprises instructions that, in response to being executed on the computing device, cause the computing device to perform object recognition by generating, based on training image data, a full convolutional neural network comprising at least the one or more convolutional neural network layers and one or more fully connected neural network layers, generating an available pool of response maps based on the full convolutional neural network, and determining the predetermined subset of response maps from the available pool of response maps, wherein determining the predetermined subset of response maps comprises applying a boosting technique to generate the strong classifier based on the predetermined subset of response maps.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method comprising:
receiving a pre-trained deep convolutional neural network comprising a plurality of convolutional neural network layers followed by one or more fully connected neural network layers;
generating a binary neural network features pool comprising a plurality response maps, wherein the binary neural network features pool comprises at least a response map for each convolutional kernel of a last convolutional neural network layer of the plurality of convolutional neural network layers;
training and selecting among a plurality of support vector machine classifiers to generate a pre-trained strong classifier and a corresponding subset of the response maps for use by the pre-trained strong classifier; and
eliminating the fully connected neural network layers and one of a plurality of convolutional kernels from the last convolutional neural network layer or the last convolutional neural network layer and a plurality of convolutional kernels from a second convolutional neural network layer of the plurality of convolutional neural network layers to provide a final pretrained convolutional neural network, the final pretrained convolutional neural network and the pre-trained strong classifier for application to input image data to generate a corresponding object label, wherein remaining convolutional kernels of the last or second convolutional neural network layer each correspond to one response map of the subset of response maps.

2. The method of claim 1, wherein the binary neural network features pool comprises at least one response map from each of the convolutional neural network layers.

3. The method of claim 1, wherein the final pretrained convolutional neural network comprises each of the convolutional neural network layers in response to at least one response map of the subset of the response maps corresponding to the last convolutional neural network layer.

4. The method of claim 1, wherein the last convolutional neural network layer is eliminated from the final pretrained convolutional neural network in response to no response map of the subset of the response maps corresponding to the last convolutional neural network layer.

5. The method of claim 1, wherein training and selecting among the plurality of support vector machine classifiers comprises:
determining weighed classification error rates for the support vector machine classifiers;
selecting a first support vector machine classifier as a new weak classifier based on the first support vector machine having a minimum error rate;
determining a weight for the first support vector machine classifier; and
generating the pre-trained strong classifier based at least in part on the first support vector machine and the weight.

6. The method of claim 1, further comprising:
training an initial deep convolutional neural network using first training data to generate the pre-trained deep convolutional neural network, wherein the first training data is separate from second training data used to generate the pre-trained strong classifier.

7. The method of claim 1, wherein application of at least one of the plurality of convolutional neural network layers comprises application of at least one of a rectified linear unit, a max pooling operation, or a local response normalization.

8. The method of claim 1, further comprising:
generating, via the final pretrained convolutional neural network, a first set of binary neural features based on first input image data, wherein the first set of binary neural network features are associated to the subset of response maps; and
applying the pre-trained strong classifier to the first set of binary neural features to generate a first object label for the first input image data.

9. The method of claim 1, wherein the first object label comprises a human body recognition object label.

10. A system comprising:
a memory to receive a pre-trained deep convolutional neural network; and one or more processors coupled to the memory, the one or more processors to:
receive a pre-trained deep convolutional neural network comprising a plurality of convolutional neural network layers followed by one or more fully connected neural network layers;
generate a binary neural network features pool comprising a plurality response maps, wherein the binary neural network features pool comprises at least a response map for each convolutional kernel of a last convolutional neural network layer of the plurality of convolutional neural network layers;
train and select among a plurality of support vector machine classifiers to generate a pre-trained strong classifier and a corresponding subset of the response maps for use by the pre-trained strong classifier; and
eliminate the fully connected neural network layers and one of a plurality of convolutional kernels from the last convolutional neural network layer or the last convolutional neural network layer and a plurality of convolutional kernels from a second convolutional neural network layer of the plurality of convolutional neural network layers to provide a final pretrained convolutional neural network, the final pretrained convolutional neural network and the pre-trained strong classifier for application to input image data to generate a corresponding object label, wherein remaining convolutional kernels of the last or second convolutional neural network layer each correspond to one response map of the subset of response maps.

11. The system of claim 10, wherein the binary neural network features pool comprises at least one response map from each of the convolutional neural network layers.

12. The system of claim 10, wherein the final pretrained convolutional neural network comprises each of the convolutional neural network layers in response to at least one response map of the subset of the response maps corresponding to the last convolutional neural network layer.

13. The system of claim 10, wherein the last convolutional neural network layer is eliminated from the final pretrained convolutional neural network in response to no response map of the subset of the response maps corresponding to the last convolutional neural network layer.

14. The system of claim 10, wherein the one or more processors to train and select among the plurality of support vector machine classifiers comprises:
determine weighed classification error rates for the support vector machine classifiers;
select a first support vector machine classifier as a new weak classifier based on the first support vector machine having a minimum error rate;
determine a weight for the first support vector machine classifier; and
generate the pre-trained strong classifier based at least in part on the first support vector machine and the weight.

15. The system of claim 10, the one or more processors further to:
train an initial deep convolutional neural network using first training data to generate the pre-trained deep convolutional neural network, wherein the first training data is separate from second training data used to generate the pre-trained strong classifier.

16. The system of claim 10, wherein application of at least one of the plurality of convolutional neural network layers comprises application of at least one of a rectified linear unit, a max pooling operation, or a local response normalization.

17. The system of claim 10, the one or more processors further to:
generate, via the final pretrained convolutional neural network, a first set of binary neural features based on first input image data, wherein the first set of binary neural network features are associated to the subset of response maps; and
apply the pre-trained strong classifier to the first set of binary neural features to generate a first object label for the first input image data.

18. At least one non-transitory machine readable medium comprising a plurality of instructions that, in response to being executed on a computing device, cause the computing device to:
receive a pre-trained deep convolutional neural network comprising a plurality of convolutional neural network layers followed by one or more fully connected neural network layers;
generate a binary neural network features pool comprising a plurality response maps, wherein the binary neural network features pool comprises at least a response map for each convolutional kernel of a last convolutional neural network layer of the plurality of convolutional neural network layers;
train and select among a plurality of support vector machine classifiers to generate a pre-trained strong classifier and a corresponding subset of the response maps for use by the pre-trained strong classifier; and
eliminate the fully connected neural network layers and one of a plurality of convolutional kernels from the last convolutional neural network layer or the last convolutional neural network layer and a plurality of convolutional kernels from a second convolutional neural network layer of the plurality of convolutional neural network layers to provide a final pretrained convolutional neural network, the final pretrained convolutional neural network and the pre-trained strong classifier for application to input image data to generate a corresponding object label, wherein remaining convolutional kernels of the last or second convolutional neural network layer each correspond to one response map of the subset of response maps.

19. The non-transitory machine readable medium of claim 18, wherein the binary neural network features pool comprises at least one response map from each of the convolutional neural network layers.

20. The non-transitory machine readable medium of claim 18, wherein the final pretrained convolutional neural network comprises each of the convolutional neural network layers in response to at least one response map of the subset of the response maps corresponding to the last convolutional neural network layer.

21. The non-transitory machine readable medium of claim 18, wherein the last convolutional neural network layer is eliminated from the final pretrained convolutional neural network in response to no response map of the subset of the response maps corresponding to the last convolutional neural network layer.

22. The non-transitory machine readable medium of claim 18, wherein the computing device to train and select among the plurality of support vector machine classifiers comprises the computing device to:
determine weighed classification error rates for the support vector machine classifiers;
select a first support vector machine classifier as a new weak classifier based on the first support vector machine having a minimum error rate;

determine a weight for the first support vector machine classifier; and generate the pre-trained strong classifier based at least in part on the first support vector machine and the weight.

23. The non-transitory machine readable medium of claim 18, further comprising instructions that, in response to being executed on the computing device, cause the computing device to:

train an initial deep convolutional neural network using first training data to generate the pre-trained deep convolutional neural network, wherein the first training data is separate from second training data used to generate the pre-trained strong classifier.

24. The non-transitory machine readable medium of claim 18, wherein application of at least one of the plurality of convolutional neural network layers comprises application of at least one of a rectified linear unit, a max pooling operation, or a local response normalization.

25. The non-transitory machine readable medium of claim 18, further comprising instructions that, in response to being executed on the computing device, cause the computing device to:

generate, via the final pretrained convolutional neural network, a first set of binary neural features based on first input image data, wherein the first set of binary neural network features are associated to the subset of response maps; and apply the pre-trained strong classifier to the first set of binary neural features to generate a first object label for the first input image data.

* * * * *